United States Patent [19]

Mirel et al.

[11] Patent Number: 5,325,884
[45] Date of Patent: Jul. 5, 1994

[54] COMPRESSED AIR CONTROL SYSTEM

[75] Inventors: Robert J. Mirel, Scarsdale, N.Y.;
Robert E. Wilson, Norwalk, Conn.;
E. Charles Hunt, White Plains, N.Y.

[73] Assignee: Conservair Technologies, Kenosha, Wis.

[21] Appl. No.: 727,985

[22] Filed: Jul. 10, 1991

[51] Int. Cl.$^5$ .............................................. G05D 7/06
[52] U.S. Cl. .................................. 137/110; 137/486; 137/487.5
[58] Field of Search ............ 137/110, 486, 599, 487.5, 137/567; 417/7

[56] References Cited

U.S. PATENT DOCUMENTS

| | | | |
|---|---|---|---|
| Re. 29,383 | 9/1977 | Gallatin et al. | 137/110 X |
| 3,286,636 | 11/1966 | Schaub | 137/567 X |
| 3,744,932 | 7/1973 | Prevett | 417/7 X |
| 3,746,041 | 7/1973 | Friedland | 137/599 |
| 3,757,808 | 9/1973 | Peterson et al. | 137/487.5 X |
| 3,847,173 | 11/1974 | Hill | 137/110 |
| 4,453,948 | 6/1984 | Fasching | 137/486 X |
| 4,561,458 | 12/1985 | Hoffmann | 137/110 X |
| 4,643,213 | 2/1987 | Mirel | 137/110 X |
| 4,711,275 | 12/1987 | Ford et al. | 417/7 X |
| 4,961,441 | 10/1990 | Salter | 137/487.5 X |

Primary Examiner—Stephen M. Hepperle
Attorney, Agent, or Firm—Andrus, Sceales, Starke & Sawall

[57] ABSTRACT

This invention provides an air control system which is retrofittable in an intermediate position between upstream compressors and air storage vessels and downstream useful production equipment or the like to provide benefits of greater air-utilization efficiency and a better air system balance between supply and demand, especially on an air-weight flow basis. A preferred embodiment employs a plurality of servo-driven flow controllers in parallel between a pair of header tanks and controls them in response to sensed downstream pressures and to the pressure differential across the control system.

20 Claims, 2 Drawing Sheets

COMPRESSED AIR CONTROL SYSTEM

TECHNICAL FIELD

The present invention relates to control systems for pneumatic plant supplies and is particularly, although not exclusively, concerned with an improved air control system for compressed air supplies used to power industrial or commercial equipment and to a complete air system which integrates such air control system with air compressor means and useful air-powered equipment.

BACKGROUND

Many factories use compressed air as a major source of power for operating their production machinery. The air is typically supplied from on-site or nearby compressors and piped to a downstream use or demand area through a distribution system, with pressure-stabilizing storage means being provided upstream, in the form of tanks or receivers. Typical equipment includes pneumatically powered machine tools, drills, wrenches, presses and lathes, as well as mills and buffers, and low demand spray booths and instrumentation. Such equipment is commonly referred to in the art as the "article", a generic term connoting anything connected to the air system to make use of the supply.

End users want the air system to maintain adequate pressure to run their air-powered equipment and few consider the energy costs of the air.

Major changes in downstream demand create varying loads on the compressors. Air compressors are typically controlled according to system supply pressure, coming on-line as system pressure at the compressor, or nearby, drops below a threshold pressure and going off-line at a higher cutout pressure. This is necessarily a rather crude control system, especially as air compressors are slow to respond to changes. As factory production drops off, for example at the end of a shift, air demand declines, and this decline can be quite sudden.

System pressure rises substantially to unload compressor horsepower until compressor output can be adjusted and this overpressure can increase the air consumption rate as still-operating machinery uses more air and also increases leakage. These overpressure losses constitute an artificial demand resulting in wasted energy. Being designed to maintain a threshold working pressure under conditions of heavy demand, most air systems use an excess of compressor capacity over the theoretical capacity needed to give satisfactory operational results, with consequent unnecessary capital expenditure and running costs.

Prior art pneumatic control systems generally depend upon the above-described crude compressor switching together with pressure regulators operating at the article to protect individual pieces of equipment from pressure surges. Such regulators can be controlled from downstream pressure detectors with a feedback loop and typically discharge overpressures to atmosphere.

In general, the prior art uses local control with little if any thought given to overall system control. In general, the prior art has paid little, if any attention to overall system efficiency. Indeed, it has been a surprising observation relating to the genesis of the present invention that most operators set their regulator valves to maximum, probably in the belief that they will get more performance out of their equipment. Such operators display little regard for system efficiency and equipment durability.

These rather simple control devices merely provide a preliminary level of control and do little if anything to improve the overall system efficiency. Other substantial drawbacks associated with the use of such downstream flow controllers are that mechanical and pneumatic inertia, or hysteresis, slow the responsiveness of the system allowing, substantial abnormalities and consequent air, or energy, losses to develop.

SUMMARY OF THE INVENTION

It is an object of the present invention to provide an improved pneumatic control system for compressed air supplies which can reduce the energy consumption of a variable-demand compressed-air system.

Another objective of this invention is to provide an improved pneumatic control system for compressed air supplies which control system is responsive and fast-acting.

A further object of the invention is to provide an improved pneumatic control system for compressed air supplies which control system can increase the useful work loads that can be placed on a supply system without increasing compressor capacity.

Yet another object of this invention is to provide an improved pneumatic control system for compressed air systems which can balance the air system by more closely matching supply to useful demand capacity than has heretofore been possible.

A still further object of the present invention is to provide an improved pneumatic control system for compressed air supplies which can reduce wastage of air or compressor energy.

Another object of the present invention is to provide an improved pneumatic control system for compressed air supplies which is adaptable to control high air flow ratings at peak demands yet capable of accurate control of much smaller off-peak loadings with greatly reduced flow rates.

The invention provides a remedy for one or more of the problems encountered with prior art systems.

Accordingly, the invention provides, in one aspect an air control system for a compressed air system for installation in a main air conduit disposed intermediately between air compressor means to supply compressed air to a main air supply conduit and air-operated equipment connected to receive pressurized air from said air supply conduit, the compressed air system having available air storage capacity upstream of said flow controller; which control system comprises:

a) a flow controller for controlling air flow through said main air supply conduit;
   b) means to monitor air-weight flow downstream of the flow controller and generate an air-weight flow related demand signal; and
   c) actuator means to operate the flow controller in response to said demand signal;

thereby to adjust said flow controller to match the air flow through said main air conduit with said air-weight flow demand. The invention extends to such a compressed air system with the air control system installed in it, especially when the compressed air system is operating under the control of the installed air control system.

In another aspect, the invention provides a pneumatic control system for compressed air supplies which comprises:

(a) an upstream manifold connectable to a compressed-air supply conduit providing a source of compressed air;

(b) a downstream manifold connectable to a variable compressed-air demand through a delivery conduit;

(c) a plurality of airways extending between said manifolds to distribute compressed air from the source conduit to the demand conduit;

(d) a plurality of flow controllers disposed one to each airway to control the air flow therein;

(e) actuator means to actuate the air flow controllers in response to downstream demand to stabilize the downstream air pressure.

In a broad sense, the invention also provides a management subsystem for an air control system having one or more air-flow controllers which sub-system comprises:

pneumatically actuated servo means for said flow controllers;

electropneumatic means to apply air to drive said servo means in response to an electric control signal;

pressure-sensing means sensing downstream demand pressure in said air system and producing a pressure signal reporting pressure fluctuations with time;

a logic controller coupled to said electropneumatic or pneumatic means and said pressure sensing means to receive said pressure signal and provide said control signal, said logic controller being capable of processing said pressure signal to provide an air-mass flow related signal as said electric control signal;

whereby the management system can operate said flow controllers to stabilize downstream demand pressure.

The air control system of this invention is thus positioned intermediately between the supply and the demand in a position where upstream storage capacity can be utilized for buffering purposes to smooth the balance between supply and demand. This upstream storage capacity can be derived not just from receivers, but also from pipes, driers and any other volumetric capacity in the upstream system.

In bigger air systems, there will be a plurality of compressors, which may number into the tens or more, and of course a considerable number and variety of downstream, demand equipment which can easily exceed tens and may number into hundreds of pieces of equipment supplied by a distribution network of branch lines.

The downstream demand can be sensed by a pressure transmitter, said actuator means operating the flow controllers in response to said pressure fluctuations so as to smooth the demand on the compressed air supply and provide a stabilized precise demand side pressure.

In this manner, the control unit of the invention is provided with a number of control sub-units each providing independent airways or circuits between the air source and the air demand, and each having its own flow controller. The air circuits should be parallel in a pneumatic sense and preferably are parallel in a mechanical sense. More than two circuits can be used and some or all of these can be coupled to be operated, or have their flow controllers driven, in unison or in harness.

The use of a plurality of parallel-circuited flow controllers has distinct advantages over a single, more massive flow controller similarly placed. The size of equipment needed to manage air flow ratings of the order of tens of thousands of cubic feet per minute (cfm) introduces major hysteresis lags and inertia losses. Furthermore, such a unit lacks redundancy provisions and cannot be expected to control small off-peak flows in a sensitive manner.

In a particularly advantageous embodiment, two or three or more control sub-units are thus coupled to handle peak demand, while a further, trim sub-unit is provided for effective control of much smaller off-peak loads, the coupled sub-units being shut-down during periods of very low demand, for example at night. The trim sub-unit can, of course also contribute to the control of peak loads.

In addition to the control sub-units, the airways preferably also comprise a fail-open by-pass sub-unit which, in preferred embodiments of the invention, can be controlled to provide several useful functions distinct from those of the control sub-units, for instance, dampening surges and regulating back pressure.

The air control unit preferably comprises an upstream manifold for distributing the air supply to the air ways and a downstream manifold for collecting a controlled air supply from the air ways and delivering it to the air demand. The upstream manifold is connectable with an upstream supply conduit and the downstream manifold is connectable with a demand conduit.

In the preferred practice of the invention the manifolds are designed to offer little or no resistance to air flow through them, providing free and easy distribution of air between the airways of the inventive control system and the supply and demand conduits. The manifolds can comprise header tanks extending transversely of the control airways and the supply and demand conduits. If the header tanks are generously proportioned, they not only will facilitate free air flow but can also contribute valuable air-storage capacity for buffering purposes. Assuming them to be elongated in a transverse direction and to have a substantially uniform transverse cross-section, by being, for example cylindrical, their individual cross-sectional areas can, with advantage, clearly exceed the cross-sectional areas of the respective supply and demand conduits with which they communicate, preferably by a margin of at least 20 percent.

The use of header tanks in this manner facilitates a sturdy, integral construction which, if the sub-units are generally of self-supporting metal pipe construction, is braced by the sub-units extending between the header tanks.

Although not the only possible configuration, this arrangement is advantageous in that it can be conveniently adapted for retro-fitting to existing air systems to be readily inserted as an intermediate unit in a section of trunk pipe in the air system. For this purpose the air control system can be provided with opposed, outwardly disposed and aligned supply and demand ports matched to the trunk pipe to be coupled thereto.

A typical compressed air power system comprises air compressors constituting the compressed-air source, receiving vessels, heat exchangers and distribution piping as well as the useful equipment or machinery that is driven by the compressed air and constitutes the demand. One or more of the control units of this invention can be installed in such a system and is preferably located in a main feeder or trunk pipe as close, in terms of volumetric capacity, as practicable, to the demand, subject to adequate pipe diameters in the system. In most situations, only one control unit will be appropriate so that it will be located in a, or more probably the, main feeder or trunk. However, large air systems may benefit from a plurality of control units: one to each of a number of main branch conduits.

By locating the control unit in a downstream position, unique characteristics of the invention provide special advantages which lead to a more balanced and economical air system. More specifically, the upstream volumetric capacity comprising besides the compressors, any receivers, upstream piping, heat exchangers and other upstream equipment, can be converted by the system of the invention into useful primary storage, providing valuable pressure-buffering capacity which contributes greatly to the overall balance of the system, under a diversity of conditions, improving its efficiency.

Furthermore, the downstream distribution piping system, with the demand equipment, can be controlled to operate at a more constant pressure than was heretofore possible. Indeed, it is an important benefit of this invention that the demand pressure can for the most part, while ignoring strictly local transient effects as equipment is brought on and off line, be constrained within a surprisingly narrow range, greatly improving the operating efficiency and stability of the system to the satisfaction of users and management alike.

BRIEF DESCRIPTION OF THE DRAWINGS

One way of carrying out the invention is described in detail below with reference to the drawings which illustrate only one specific embodiment of the invention and in which.

BEST MODE FOR CARRYING OUT THE INVENTION

Figure 1:
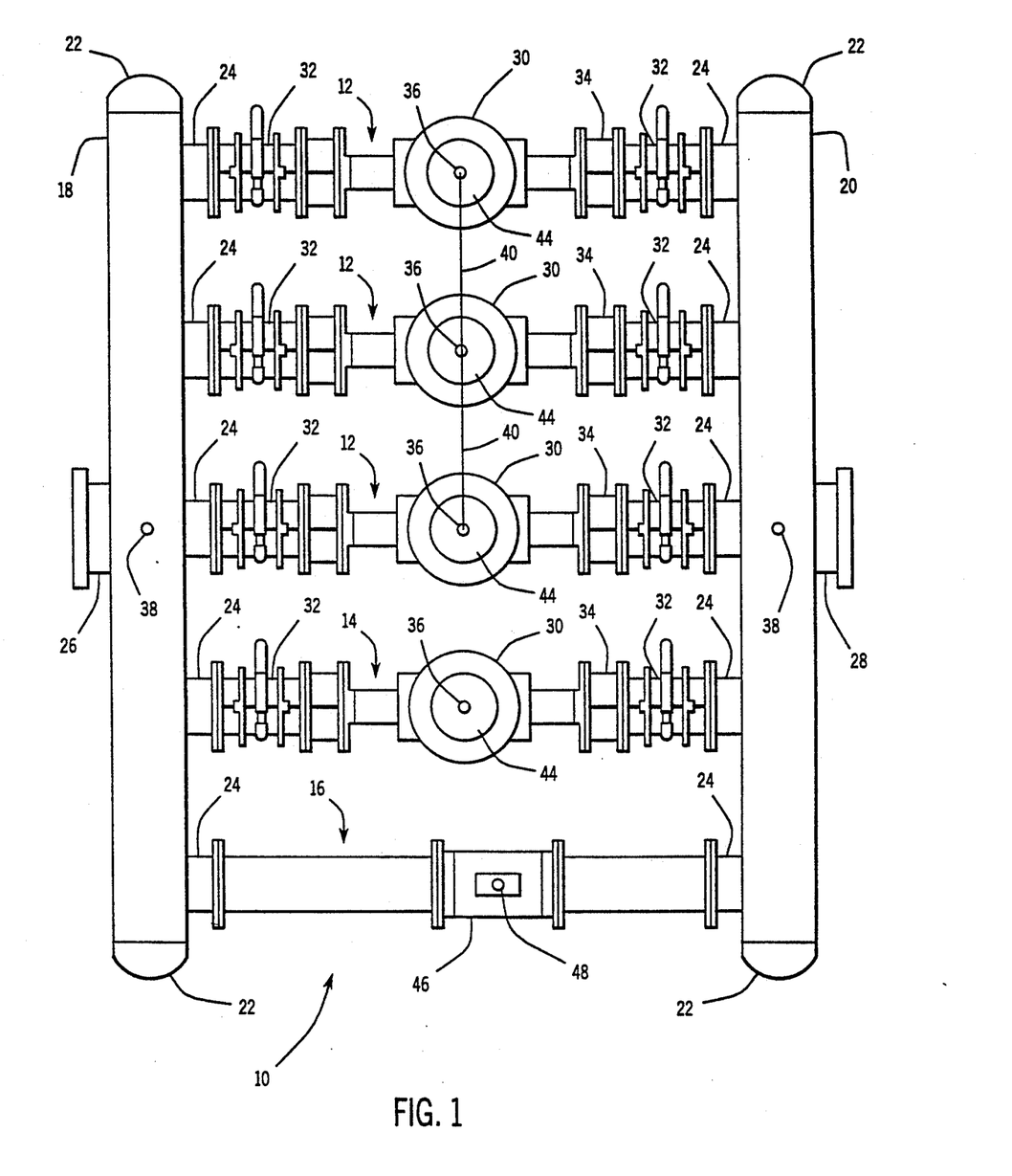
FIG. 1 is a schematic view, which may be read in elevation or in plan, of one embodiment of an air supply control system according to this invention and from which various electronic and sensor sub-systems have been omitted for clarity.

Referring to FIG. 1, the air supply control unit is indicated generally at 10 and comprises three main air control sub-units 12, a trim air control sub-unit 14 and a by-pass sub-unit 16. The sub-units 12, 14 and 16 are each in the form of a pipe carrying various control devices, to be described, and each extends in a generally parallel manner between a pair of perpendicularly disposed header tanks 18 and 20 with which the sub-units 14 and 16 are in free communication, providing controlled airways therebetween.

Header tanks 18 and 20 can be welded steel cylindrical tanks with domed end caps 22, and are provided with an array of flanged sub-unit ports 24 aligned along one side. On an opposite side, the tank 18 has a flanged inlet port 26 to mate with an air supply trunk conduit (not shown) and to receive compressed air. Similarly, tank 20 has, on a side opposite its array of ports 24, a flanged outlet port 28 mateable with an air delivery conduit (not shown), which delivery conduit leads to the air-powered equipment or machinery served by the system. Tank 18 thus becomes an upstream manifold while tank 20 becomes a downstream manifold.

Each air control sub-unit 12 and 14 is equipped in its mid-section with a flow controller 30 and at its ends with a pair of service valves 32 to isolate it from header tank 18 or 20. Upstream of the downstream service valve 32, each sub-unit 12 and 14 has a one-way check valve 34 to prevent back flow through the airway or circuit provided by the sub-unit, from the demand to the source.

Each flow controller 30 has a pilot air port 36 for a pneumatic control line (not shown in FIG. 1) linking the flow controller to a pneumatic sensing and actuating system which will be more fully described in connection with FIG. 2. Pilot air ports 38, one to each, serve a similar role for the header tanks 18 and 20. The flow controllers 30 are preferably driven by servos indicated schematically (in keeping with other elements of the system) at 44. The servos 44 are preferably actuated and controlled by pneumatic signals received through the pilot ports 36 in the preferred management sub-system of the invention which employs electropneumatic transducers. With advantage, the flow controllers 30 have valve elements that are spring-biased to a closed position. However, in alternative embodiments providing some of the benefits of the invention, the pneumatic aspects of the management system can be substantially by electronic, fluidic or even manual elements, the servos 44 being actuated by an electronic signal.

As indicated schematically by the common line 40, the three flow controllers 30 of the three main air control sub-units 12 are operated in unison, receiving similar control signals and opening and closing to a similar extent, as those signals are applied. The trim sub-unit 14 and its controller 30 operate independently of the main sub-units 12. These three main air sub-units 12 could with some advantage be operated in response to pressure differentials or pressure levels by a more or less direct mechanical drive or even with some manual intervention, but such mechanical or manual management system would be far less efficient than the preferred electropneumatic management system to be described.

By-pass sub-unit 16 is equipped with a motorized by-pass valve 46 having a further small servo air port 48 and is installed in an independent, but parallel, air circuit between the headers 18 and 20. It is preferably fail-safe, being biased to an open position in response to loss of servo pressure or other system failures. Motorization of the by-pass valve 46 enables it to fulfil a number of useful functions to be described.

Each flow controller 30 is a slave unit in the overall control system and is preferably designed to have small or lightweight moving actuator elements to minimize internal mechanical inertia in the flow-controller's valve train and consequent hysteresis lags. The flow controllers 30 should also be designed to maximize the flow capacity of the controller 30 in relation to its size, thereby to minimize flow resistance, and pressure drops across the flow controller. They should be free-flow, without constriction in the wide-open position. Diaphragm-type gate regulators with feedback control are suitable, for example the R18 series of pilot operated regulators supplied by C. A. Norgren Co., Littleton, Colo.

While stock flow controllers may be usable in practicing this invention, the preferred practice to meet the objectives disclosed herein is to modify such flow controllers or regulators to reduce their flow resistance and any pressure drop across them. This can be done by using lighter springs than stock, plugging any leaks or exhausts, polishing and other techniques familiar to those skilled in the art, including changing or modifying flow control elements to be lighter or to offer a fuller throat in the wide-open position. Also or alternatively, the logic circuits, to be described, can be adapted to compensate for pressure losses across the flow controllers, once their values have been determined. Such modifications can also be directed to reducing the mechanical inertia in the valve or regulator and to increasing the speed of response, all of which considerations affect overall efficiency.

The issue of reduction of pressure losses is important because the control system is an introduced system that must justify its presence by appropriate savings. These will not be achieved if the control system introduces significant energy losses by way of pressure drops. Moreover, there is little pressure available for control purposes. A typical supply pressure may be in the range of 90 to 110 psig. If the regulator drops 20 lb. or so, as some do, it will impede equipment performance.

The servos 44 preferably operate against spring means biasing the flow controller or valve 30 into a closed position. Suitable servo or pneumatic valve positioner units are supplied by Cashco, Inc. Elsworth Kans., for example their #48 and #148 series actuators which have a rolling diaphragm, multi-spring construction. These are available in fail-open or fail-close constructions. Fail close is suitable for the flow controllers 30 while a fail-open model can be used as the motor unit for motorized by-pass valve 46.

The check valves 34 are intended to prevent back flow and should be high-quality valves that are sensitive to small back pressures and seal efficiently, preferably bubble-tight.

The service valves 32 should ensure minimum flow restriction, providing a full-bore flow path, and serve to isolate an individual air-control sub-unit 12 or 14 for maintenance or replacement. A full-port ball design is an example of a suitable design. With the multiple path arrangement shown, individual air control sub-units 12 or 14 can be taken down while the others are in service, avoiding shut-downs for maintenance.

Service valve isolation is not normally necessary for the by-pass sub-unit 16, but can be supplied if desired. Preferably, the by-pass valve 46 is controlled to maintain a predetermined pressure difference across the air control system 10, to prevent an instantaneous flow rate increase and attendant depletion of upstream storage below desired pressure thresholds that may trigger premature compressor start-up.

The arrangement shown in FIG. 1 is, in the most preferred embodiment of this invention, constructed to be self-supporting and rigid. It will be appreciated that the generally recti-linear layout of a plurality of airways extending between cylindrical headers 18 and 20 facilitates this objective. The somewhat planar or laminar construction with a modest depth and much greater width and height and an overall, more-or-less rectangular configuration is especially convenient for retrofitting in a variety of situations in a convenient and compact manner. The air control system can readily be installed as an integral unit in a horizontal or vertical position, with little, if any, additional support means such as brackets or struts, assuming the mating air supply and delivery lines are solidly supported at, or near the inlet and outlet ports 26 and 28.

A sturdy or solid, self-supporting, integral structure of the air supply control unit 10 is promoted by the use of appropriately rated steel pipe for the pipe elements of the sub-units 12, 14 and 16, with flanged connections to and between the operative components of the sub-units 12, 14 and 16, and by a welded, flanged steel construction of the sub-unit ports 24 on the headers 18 and 20. These arrays of aligned ports 24 help resist rotational and twisting stresses.

In one practical and exemplary embodiment, which should of course be understood to be non-limiting as to the scope of the invention, and which is suitable for managing a normal peak air flow capacity or rating of about 3,000 cfm, the air supply and delivery conduits of the air system, and therefore the inlet and outlet ports 26 and 28 of the air-control system of the invention, have internal diameters of 3 inches, 76 mm. while the sub-units 12, 14 and 16 have internal diameters of 2.5 inches, about 63 mm., each. The header tanks 18 and 20 suitably are about 48 inches, 122 mm., long or high and about 4 inches, 102 mm., in diameter with the width of the system 10 across the inlet and outlet ports 26 and 28 being about 54 inches, 137 mm. These dimensions give the header tanks 18 and 20 a volume of the order of about 580 cubic inches, 9.5 liters. With careful choice of the operative components, the depth can be constrained to about 18 inches, 46 mm.

Figure 2:
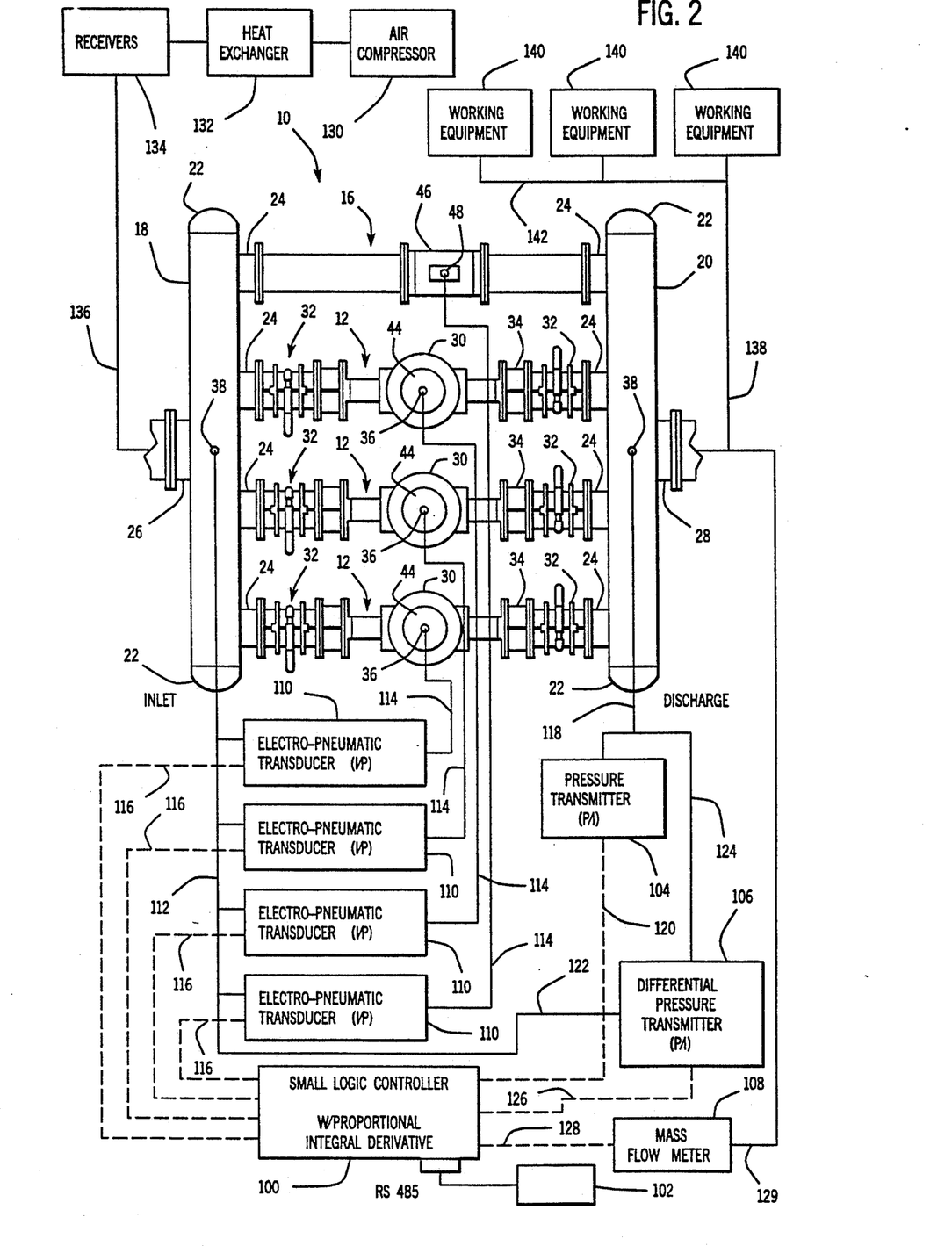
FIG. 2 is a view similar to FIG. 1, of another embodiment of the invention, with some possible electronic and sensor sub-systems shown schematically, similar components using the same reference numerals as in the FIG. 1 embodiment.

The embodiment of FIG. 2 shows a modified air control unit 10 having three main air control sub-units 12, a by-pass sub-unit 16 disposed on the other side of the sub-units 12 from the FIG. 1 position, but lacking any trim sub-unit 14.

Shown schematically in line-and-box fashion is an electropneumatic management system employing air sensors and servos and digital or analog signal processing. This is a preferred regime which lends itself to computer interfacing, especially to a PC or a PC network and can function effectively with a modicum of human intervention.

This management system, which will shortly be described in more detail, has its own novel and inventive characteristics and constitutes the best currently known means for managing the air control unit 10 or an air system in which an air control unit 10 is installed. However, it is not, of course, the only possible management system that can be used while still gaining benefits from the novel and inventive characteristics of the air-control unit 10. Simpler systems, perhaps employing more manual intervention, will occur to those skilled in the art. On the other hand, it can be expected that advances in the relevant arts of process management, signal processing and sensor design will yield improved management systems that better exploit the advantages of the invention or inventions disclosed herein.

Referring now to the particular management sub-system depicted in FIG. 2, this sub-system comprises a brain in the form of a small logic controller 100, an operator interface 102, sensors in the form of a pressure transmitter 104, a differential pressure transmitter 106 and a mass-flow meter 108, as well as four parallel-connected electropneumatic transducers 110. These components communicate through a bi-partite nervous system comprising on the pneumatic side, small gauge, high grade air lines, for example, ¼ inch, 22 mm, reinforced plastic with brass terminations and on the electrical or electronic side by conductor wires of adequate gauge to carry, for example, 4 to 20 mA signal currents without noticeable attenuation.

The nervous system includes a common air bleed line 112 which runs from port 38 in upstream header tank 18 and applies the pressure therein to the four electropneumatic transducers 110, one each of which is connected in independent parallel circuit by an air line 114 respectively to each of the three flow controllers 30 in the main air-control sub-units 12, and to the motorized by-pass valve 116 in the by-pass sub-unit 16. The electropneumatic transducers 110 are separately actuated by signals received over individual conductors 116 and each has an air output line 118 coupled to port 36 of a flow controller 30 or port 48 of the motorized by-pass valve 46. In this manner, the electropneumatic transducers 110 can apply pressurized air from header tank 18 to drive or actuate the flow controller 30 or the by-pass valve 48 in accordance with electrical control signals received from the small logic controller 100.

A suitable, sensitive electropneumatic transducer 110 designed for precision valve-actuation applications, is supplied by Fairchild Controls, for example their T6000 series of miniature transducers which transmit a pneumatic signal which is linearly proportional to a DC input, for example, a 4 to 20 mA control signal. These products are also field reversible permitting the output to be inversely proportional to the input signal.

The pressure transmitter 104 reads the pressure in downstream header tank 20 from air port 38 via air line 118 and sends a corresponding output signal to the small logic controller 100 via a conductor 120. A suitable pressure transmitter is a variable capacitance sensor generating a 4 to 20 mA signal output with a sensitivity of at least 1 percent. Setra Systems, Inc., Acton Mass. supplies such a transducer in its model 206/207 line with an advertized sensitivity of about 0.13%.

Differential pressure transmitter 106 receives air pressure inputs from the upstream header tank 18 via an air line 122 and from the downstream header tank 20 via an air line 124 and puts out a difference signal, reflecting the pressure difference between the tanks 18 and 20, to the small logic controller 100 via a conductor 126.

The mass flow meter 108 preferably is connected just downstream of the intermediately mounted air control unit 10 as indicated by the line 129 and its output signal, preferably an analog current signal in the 4 to 20 mA range, goes to the small logic controller via a conductor 128. The mass flow meter can be any sensitive device capable of accurate flow measurements in a conduit without undue loss of pressure across it.

A preferred mass flow meter produces a temperature-compensated output for which purpose it can include a temperature sensor to determine air temperature within the conduit and to track fluctuations in that temperature. A suitable mass flow meter is of the insertion type and comprises a heated probe residing in the air flow. The cooling effect of the air flow is measured to determine the rate of mass or weight flow. Sensitivities of 5 percent or less of full scale, preferably under 2 percent, with a flow time response under 5 seconds, preferably under 2 seconds, are desirable. Suitable such mass flow meters are supplied by Sierra Instruments under the trade mark "Accu-Flo". These instruments offer velocity flow rate ranges up to 12,000 standard feet per minute, with a full scale accuracy of about 1 percent and a flow time response of about 0.2 seconds. More accurate determinations of flow through a large duct subject to turbulence can be obtained by the use of an array of mass flow meter probes disposed around the duct. Such a system is supplied by Sierra Instruments under the trade mark "Sting". Such an array system can accurately average the outputs of the probes.

Bearing in mind the potential cash savings and return on investment the air control system of this invention can bring, the hardware used should be of high quality to be durable and reliable, and in the case of the sensors and controllers, sensitive and accurate, as well as fast acting.

Further, it is desirable that the pressure transmitter 104 and the differential pressure transmitter 106 are able to put out real-time signals that are accurate reflections not just of static pressures at sample intervals, but are real-time reports of pressure fluctuations on a sub-second, better still, milli-second basis. Thus, a preferred output from the pressure transmitter 104 and the differential pressure transmitter 106 is dynamic and is at least a first order differential with respect to time of the static pressure, or pressure difference (transmitter 106), to provide some forecast of the amplitude of pressure change. Further advantage will derive from a second differential pressure output which can be useful in forecasting the speed at which a future pressure amplitude will be reached.

Also shown schematically in FIG. 2 are the connection of air compressors 130 and associated heat exchangers 132 and receivers 134 to the upstream header tank 18 through an air-supply trunk conduit 136. In a comparable manner, compressed air is delivered from the downstream header tank 20 through a delivery conduit 138 to multiple working equipment 140 via an air distribution system indicated schematically by lines 142.

Clearly, the apparatus of the invention, notably the air control unit 10 can be operated in a number of different ways according to the management algorithms used in the small logic controller 100, if such is employed.

Accordingly, the air control unit 10 can be operated in a simple or a more sophisticated manner.

Broadly stated, the management sub-system described senses downstream air demand as reflected primarily by the pressure history at the downstream header tank 20, although further benefits may accrue from adding sensors in the distribution system downstream of the header tank 20, especially in the vicinity of critical or high-demand equipment, and adjusts the flow controllers to stabilize downstream air pressure. This stabilization improves the efficiency of air use, leading to energy savings and better equipment performance and durability.

By rapidly closing any open flow controller 30 as demand falls, for example as equipment is shut off, the compressor load that would otherwise surge downstream to be dissipated through air leaks and inefficient, overpressure operation of the remaining on-line equipment, is contained upstream, buffered in storage provided by the header tank 18, the receivers 134, heat exchangers 132 and upstream piping, including the supply conduit 136. This isolation of the upstream surge quickly generates a back-pressure on the compressors leading to their early cutout as threshold pressure is sensed at the compressor. Such desirable energy-saving, early cutout is promoted not just by the fact of the closing of the flow controllers 30 but also by the swiftness with which they are closed, using the air control system of this invention. The reduced demand can now be supplied from the pressurized upstream storage capacity, augmented by storage in the air-control system of the invention, providing further savings as start up of the compressors is deferred.

In a preferred embodiment, the small logic controller 100 employs a loop controller receiving constant input of the downstream demand pressure, and its time-based fluctuations, from the pressure transmitter 104 together with constant input from the differential pressure transmitter 106 which, by comparison monitoring yields an upstream storage pressure signal. These inputs are integrated over time to yield a mass-flow signal which serves as the basis for an output to the electropneumatic transducers 110. The output signal is processed to provide a derivative proportional to mass flow and to fluctuations therein, which is suitably biased to allow the electropneumatic transducers 110 to drive the flow controllers 30 against spring closing.

The processing algorithms preferably also include input from temperature sensors to provide temperature compensation of the pressure signals and permit the computation of accurate air-weight flows.

This processing system can also be a multiple loop system having individual loops, one for each flow controller 30, and a different loop for the by-pass valve 46. When employed with the embodiment of FIG. 1, these process control loops can be operated in unison for the main sub-units 12 with a different algorithm for the trim sub-unit 14. This different algorithm will still have the trim sub-unit tracking weight-based air-flow demand, as accurately as possible, desirably in harness with the main sub-units 12 for maximal air demands, while including procedures to operate only the trim sub-unit at low demand levels, for example below 25 to 40% of maximum rating.

Such a multi-loop primary logic control can be closely integrated with the complete air system, including the source air compressors, by including remote pressure or flow change inputs, for example from the compressor environs, which inputs can be used to introduce compensatory adjustments, for example to allow for a lagging control response imposed by the air compressor. This integrated-system approach is of particular value when dynamic compressors are used for the base load.

The small logic controller 100 can conveniently be incorporated in a console mounted separately from or on or nearby the air control unit 10 and could be incorporated with the operator interface 102 which can include a keyboard and monitor as well as other manual controls. This console can also include a selection of optional instrumentation, for example: an electronic pressure dewpoint monitor with an adjustable alarm to warn of excess humidity; a digital flow rate display; calibrated pressure gauges; and a variety of other indicating and alerting means for high and low pressures, power on, bypass ready, excess hydrocarbon and so on.

Especially in a busy environment with frequent changes in air demand, swift response is vital to the efficiency of this control system to ensure that the flow controllers 30 are in step with actual demand, not lagging it. Even quite small lags could leave a control system badly out of step with equipment such as a pneumatic ram operated in short bursts, leading to significant losses downstream if the flow controllers are open when the equipment is off line. The control system of this invention includes a number of features that promote response time and reduce lags.

In particular, by means of the invention, it is possible to actuate the flow controllers 30, or selected ones thereof, to move with a speed reflecting the rate of change of air demand. This feature can be achieved using a sensed pressure signal which is at least a first order time differential, or using a direct mass flow sensor signal. Preferably, the speed of the mechanical action of the flow controllers is directly proportional to the rate of change of demand so that there is little or no overshoot or undershoot of the set pressure.

Contributing greatly to these ends is the use of a plurality of parallel air-control circuits provided by the sub-units 12 and 14. Where, as in preferred embodiments, the diameter of each sub-unit's flow path is from 10 to 33% less than that of the inlet port 26 and the outlet port 28, then any pair of sub-units will provide between them a greater flow section than the conduits 136 and 138, allowing assuming full flow with the flow controllers 30 short of their wide-open positions, where they have better responsiveness. In contrast with a putative, single, more massive control sub-unit, the moving elements and valve trains of the smaller, parallel clustered controllers 30 of this invention have an individual lower inertial mass enabling them to respond faster. In addition the valve elements of the flow controllers 30, while spring-biased to a closed position are carefully adjusted and calibrated to a minimum effective closing pressure so as to minimize pressure build-ups across the flow controller 30 before it opens.

To match falling system demand, the logic controller 100 reduces servo pressure to the individual main flow controllers 30 proportionately to the drop in air mass flow by an appropriate signal to the electropneumatic transducers 110. Ultimately, the main flow controllers are shut off as required to maintain stabilized control authority.

To prevent a mass flow overload, the combined open gateways of the main flow controllers can be limited to a predetermined maximum. As an additional override feature, should the upstream pressure drop below a threshold value, the flow controllers can be temporarily driven in an opposite sense to close as pressure drops, so as to protect upstream storage from excessive depletion.

As already implied and indicated, the by-pass valve 46 can protect against several eventualities. Firstly, it provides fail-safe protection to ensure that the control unit introduces no degradations into the air system, by failing open in the event of loss of primary control power. Further circumstances in which it can desirably be opened by an actuating signal from the small logic controller 100 or a remote host computer are:

i) If the demand pressure falls below a field-adjustable threshold value while the supply pressure is adequate.
ii) The differential pressure across the header tanks 18 and 20 exceeds a threshold.
iii) Or for independent management reasons.

Furthermore, the by-pass valve can be modulated to accommodate system anomalies, for example, it can be used to assist in back-pressure control to prevent a demand surge drawing down the system, by switching control authority for the valve from the downstream sensors to an upstream pressure signal.

This facility is important for what is known as event management. An event is usually a known situation or set of circumstances that put what may be regarded as abnormal stresses on the air system because they are of short duration and attempts by the control logic to adjust to event conditions may be deleterious. An example is shift startup, such as the return from lunch: Everyone goes on line at the same time creating an abnormal demand surge. As described above, appropriate operation of the by-pass valve 46 can control this surge, temporarily rationing users as they build up local pressure while conserving upstream reserves and constraining active compressor capacity within stable demand limits. The invention can thus smooth event curves.

The invention provides, when properly practiced by following the teachings herein, an air control unit system which is capable of maintaining a substantially constant downstream pressure while managing a wide range of flow conditions within a specified design capacity. An example of achievable control levels is a flow constancy of 3% or better of total flow rating. A downstream pressure constancy within 1% is also achievable during wide, specified fluctuations in the upstream supply pressure. Source pressures of several hundred pounds, for example 225 psig, are suitable in practicing the invention with lower working pressures being field-adjustable within a range of for example from 50 to 150 psig. Under such pressure conditions, air flows can be balanced within a range of from full flow to 4% of full flow.

Desirably, for example, by using the configuration shown in FIG. 1, adequate sub-unit capacity is provided for redundancy so that one sub-unit can be taken out of service while the others provide continual control at full air flow ratings.

It will further be apparent from a consideration of the foregoing disclosure, that the invention provides a means of balancing supply and demand in a compressed air system, especially a larger system on an air-mass or air-weight flow basis, giving a more meaningful and more efficient control than simple pressure-related control. In achieving this, it is important to pay due regard to temperature effects by determining temperatures at flow- and pressure-measurement points and applying appropriate compensation to the values detected, to standardize them.

Using accurate sensing and flow control equipment in conjunction with a logic controller, or computer device it becomes possible to determine not just the air-weight flow demands, but also their rates of change, which can be used to build some predictive capacity into the system. Further, comparison of demand patterns with historical records can improve the predictions to provide substantive probabilities of needed capacity in time for efficient management of the air compressors.

Thus, the unique air-control system of this invention further provides the wherewithal to manage a compressor bank in a novel and surprisingly efficient manner. The air demand information provided by the control system and its sensors can be used to time or sequence switching of the compressors. For example, newer, more efficient compressors may be run continuously while older units are brought on only at times of peak load. Also compressor activity can be sequenced according to the controllability and responsiveness of the particular compressor as well as its part-load operating efficiency.

Again in a large system, the demand area can be broken up into separate conduit zones for control purposes, the zones being demarcated by individual sensors or even by separate air control units 10. Then, data regarding storage pressure, mass flow and additional remote signals from the zones, preferably also with information as to the usage character of the zones, if they are so divided, and if such exists, can be interfaced with control means for multiple compressors to establish, with constant surveillance feedback, an optimal compressor sequence based upon individual compressor characteristics, including particularly their part-load efficiencies. Data from the zones can be weighted or adjusted to accommodate known, or predicted, air consumption characteristics.

While an illustrative embodiment of the invention has been described above, it is, of course, understood that various modifications will be apparent to those of ordinary skill in the art. Such modifications are within the spirit and scope of the invention, which is limited and defined only by the appended claims.

We claim:

1. An air control system for a main conduit of a substantially continuous flow compressed air system in which air-weight flow throughout the air control system is controlled comprising compressed air supply means providing an air supply, air-operated equipment served by said compressed air supply means and providing an air demand and a main air supply conduit connected between said compressed air supply means and said air-operated equipment to channel said air supply to said air demand, said air supply being subject to fluctuation according to variations in said air supply means and in said air demand wherein said air control system comprises:
   a) a continuously variable adjustable flow controller for controlling air flow through said main air supply conduit, said flow controller comprising a plurality of flow sub-controls in parallel configuration, each of said sub-controls having a low inertial, mechanical and fluid dynamic hysteresis;
   b) pressure monitoring means downstream of said flow controller and generating a pressure related demand signal, said demand signal fluctuating over time as a function of variations in said pressure;
   c) actuator means to operate said flow controller in response to said demand signal to stabilize downstream air pressure; thereby to adjust said flow controller to vary said air flow rate in said main air conduit according to downstream pressure variations; and
   d) a by-pass sub-control openable in response to a predetermined pressure difference across said control unit to provide a substantially free-flow by-pass airway.

2. An air control system according to claim 1 wherein said compressed air system has available volumetric air capacity upstream of said main air supply conduit and said flow controller is operative to constrain supply in said volumetric air capacity, for storage to prevent indiscriminate release of stored air.

3. An air control system according to claim 1 wherein said air control system comprises a control unit having a number of sub-controls each said sub-control providing an independent air way between said air supply and said air demand, each said sub-control having its own flow controller and said sub-controls being adjusted co-operatively and sequentially for jointly controlling said air flow.

4. An air control system according to claim 3 wherein said air ways are parallel in a pneumatic sense and in a mechanical sense.

5. An air control system according to claim 3 wherein a plurality of said sub-control is coupled for their flow controllers to be driven in unison.

6. An air control system according to claim 5 comprising a plurality of said sub-controls coupled together to handle peak demand and a further trim sub-control for controlling smaller off-peak loads, said trim sub-control being operable independently of said sub-controls.

7. An air control system according to claim 3 wherein said actuator means comprises a pneumatic servo unit for each flow controller and electropneumatic transducer means supplying air to each said servo unit in response to said pressure related demand signal.

8. An air control system according to claim 3 wherein each said flow controller has a valve element that is spring-biased to a closed position.

9. An air control system according to claim 1 further comprising logic controller means to process input signals from said pressure related demand signal and generate an output signal to operate said flow controller.

10. An air control system according to claim 9 further comprising pressure sensor means to sense demand pressure downstream of said flow controller and differential pressure sensor means sensing pressure across said flow controller both said pressure means providing input signals to said logic controller means.

11. An air control system according to claim 9 wherein said logic controller processes said demand input signal to determine rate of change of pressure related demand with time and applies said determination to adjustment of said flow controller to stabilize downstream air pressure.

12. An air control system according to claim 9 wherein said air control system comprises a control unit having a number of sub-controls each said sub-control providing an independent air way between said air supply and said air demand, each said sub-control having its own flow controller and said sub-controls being adjusted co-operatively for jointly controlling said air flow, wherein said logic controller means generates a plurality of output signals, one for each sub-control.

13. An air control system according to claim 1 wherein said air compressor means comprises a plurality of air compressors which system further comprises compressor sequencing means responsive to said pressure related demand signal and operative to load and unload compressors according to said demand signal in an energy-efficient manner.

14. An air control system according to claim 13 wherein said air compressors are sequenced according to the controllability, responsiveness and part-load operating efficiency of each respective compressor to optimize overall compressor energy efficiency.

15. A compressed air system comprising:
   a) a plurality of air compressor units connected to a main feed supply duct, said compressor units having outputs which are mixed in said duct to provide a common pressurized air supply and including compressor units with differing energy efficiency characteristics;
   b) useful air-powered equipment connectable in pneumatic-circuit with said common pressurized air supply downstream of said duct and providing a variable demand for said common pressurized air supply;
   c) continuously variable adjustable flow controller means for controlling air flow through said main air supply conduit, said flow controller means providing a flow path in a full-open position said flow path being substantially non-constricting to air flow from said main feed duct;
   e) detector means to detect imbalances between air flow upstream of said flow controller means and air flow downstream of said flow controller means; and
   f) actuator means to actuate said air flow controller means to reduce said imbalances;
wherein said air-powered equipment receives a controlled air supply and overall energy efficiency of said plurality of compressors is improved.

16. A compressed air system according to claim 15 wherein substantially all of said air-powered equipment powered from said plurality of compressors is connected downstream of said main feed supply duct to receive pressurized air through said duct, said pressurized air being subject to control by said flow controller means.

17. A compressed air system according to claim 16 further comprising a first header tank downstream of said flow controller means between said flow controller means and said air-powered equipment.

18. A compressed air system according to claim 17 further comprising a second header tank upstream of said flow controller means between said flow controller means and said plurality of compressors.

19. A compressed air system according to claim 18 further comprising pressure sensor means continuously to sense pressure at at least one of said header tanks and generate a pressure-related signal, and logic controller means to process said pressure-related signal and generate an actuation output to operate said flow controller means to increase the energy efficiency of the system.

20. A compressed air system according to claim 19 wherein said pressure-related signal is differentiated with respect to time to provide a rate of change of pressure signal.

* * * * *